United States Patent
McDuff

(10) Patent No.: US 10,362,098 B2
(45) Date of Patent: Jul. 23, 2019

(54) LOAD BALANCING BACK-END APPLICATION SERVICES UTILIZING DERIVATIVE-BASED CLUSTER METRICS

(71) Applicant: Facebook, Inc., Menlo Park, CA (US)

(72) Inventor: Mark Warren McDuff, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 434 days.

(21) Appl. No.: 15/188,279

(22) Filed: Jun. 21, 2016

(65) Prior Publication Data
US 2017/0366604 A1    Dec. 21, 2017

(51) Int. Cl.
| | |
|---|---|
| H04L 29/08 | (2006.01) |
| H04L 12/24 | (2006.01) |
| H04L 12/26 | (2006.01) |
| H04L 12/911 | (2013.01) |
| H04L 29/06 | (2006.01) |

(52) U.S. Cl.
CPC ........ *H04L 67/1002* (2013.01); *H04L 41/147* (2013.01); *H04L 43/0817* (2013.01); *H04L 43/0876* (2013.01); *H04L 47/822* (2013.01); *H04L 47/823* (2013.01); *H04L 67/42* (2013.01); *H04L 43/067* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 9,871,850 B1* | 1/2018 | Brandwine | ............ H04L 67/10 |
| 2003/0005090 A1* | 1/2003 | Sullivan, Jr. | ........ H04L 41/0816 709/220 |
| 2003/0088672 A1* | 5/2003 | Togasaki | ................. H04L 29/06 709/226 |
| 2004/0162901 A1* | 8/2004 | Mangipudi | ......... H04L 41/5009 709/225 |
| 2013/0117382 A1* | 5/2013 | Gaddam | ................. H04L 67/26 709/206 |
| 2016/0359684 A1* | 12/2016 | Rizqi | .................... H04L 41/147 |
| 2017/0163724 A1* | 6/2017 | Puri | .................... H04L 43/0805 |

* cited by examiner

*Primary Examiner* — Philip J Chea
*Assistant Examiner* — Hassan A Khan
(74) *Attorney, Agent, or Firm* — FisherBroyles, LLP

(57) ABSTRACT

Some embodiments include a back-end routing engine. The engine can receive traffic data characterizes amount of service requests from front-end servers to a server group of one or more back-end servers that corresponds to a geographical tier in a server group hierarchy. The engine can receive metric measurements in a performance metric dimension for the server group and a performance threshold corresponding to the performance metric dimension and the geographical tier. The engine can estimate a linear derivative between variable traffic data and variable performance metric in the performance metric dimension based on collected sample points respectively representing the traffic data and the metric measurement. The engine can then compute, based on the linear derivative and the performance threshold, a threshold traffic capacity of the server group. The engine can then generate a routing table based on the threshold traffic capacity.

20 Claims, 5 Drawing Sheets

LOAD BALANCING BACK-END APPLICATION SERVICES UTILIZING DERIVATIVE-BASED CLUSTER METRICS

BACKGROUND

Social networking services are accessed by users to communicate with each other, share their interests, upload images and videos, create new relationships, etc. Social networking services typically operate in a distributed computing environment with data being distributed among one or more server clusters that are each located in one of multiple data centers. A server cluster is a grouping of server computing devices ("servers"). When a user of a social networking service sends a query to request and/or process data, a front-end load balancing server can be the first server to receive the user request. The front-end load balancing server usually routes the request to a front-end server (e.g., web server) in one of the server clusters. The front-end server can identify one or more back-end application services to help respond to the user request. The front-end server generates one or more service requests to the back-end application services based on a routing table published by a back-end routing service.

A conventional back-end routing service faces different challenges than the front-end load balancing server. For example, polling performance metrics from back-end servers are much more resource intensive compared to polling the performance metrics of front-end servers. The conventional back-end routing service publishes, periodically, a routing table based on known front-end service request statistics and back-end server performance statistics. The conventional back-end routing service generally reduces amount of traffic to a back-end server whenever that back-end server is over its capacity limit. This conventional technique causes the back-end servers to frequently experience oscillations, where for example, an available back-end server often times receives a sudden overload of service requests followed by a drought of application service requests leading to sub-optimal usage.

Figure 1:
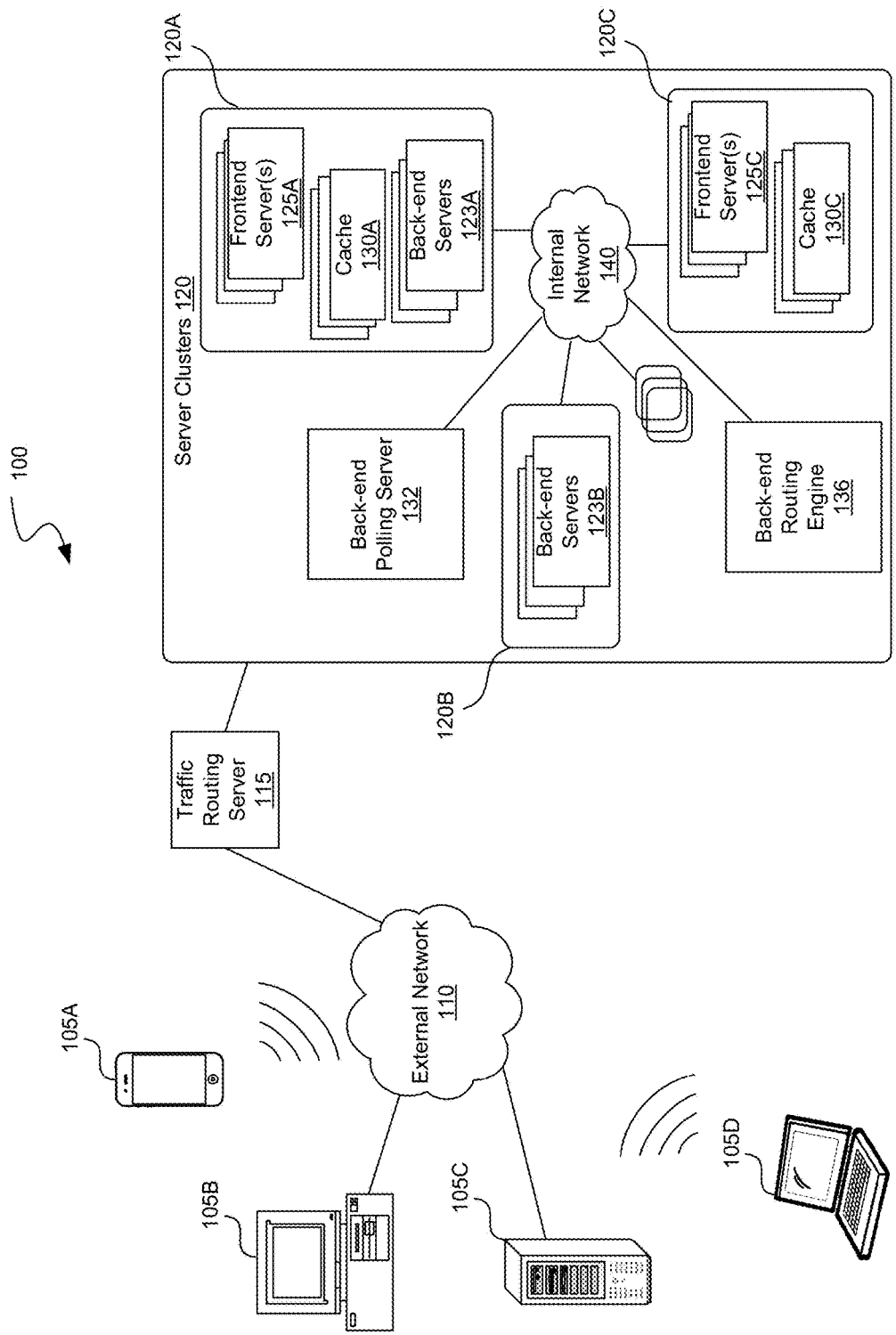
FIG. 1 is block diagram illustrating an overview of a social networking system in which some embodiments may operate.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Various embodiments are directed to routing traffic between front-end servers and back-end servers (e.g., application service servers). A back-end routing engine (e.g., running on a standalone server system or integrated with the application service servers) is configured to generate (e.g., periodically) traffic routing tables for a group of front-end servers. The back-end routing engine can collect (e.g., periodically) performance metrics from a group of back-end servers (e.g., traffic destinations) across different geographical regions and traffic data from the group of front-end servers. The back-end routing engine can also receive a set of performance metric thresholds from application service owners corresponding to the destination servers. The traffic data characterizes the amount of traffic from the front-end servers to the back-end servers. The performance metrics are measurements indicative of the capacity of the back-end servers to handle more incoming request traffic.

Each performance metric threshold can correspond to a grouping of servers under different geographical tiers (e.g., a cluster tier, a data center tier, a geographical region tier, etc.). In some embodiments, the back-end routing engine can check a most recent performance metric measurement against a performance metric threshold of a geographical tier's border to determine whether to route traffic outside of the border. For example, a front-end server in the server cluster would have to route traffic to a back-end server within the server cluster if the performance metric threshold for the "cluster tier" has not been exceeded by the most recent performance measurement.

The term "performance metric," as used herein, may refer to a group of metrics related to the performance of a computer system (including a front-end server or back-end server) such as, for example, processor usage, memory usage, network bandwidth usage, request queue length, request latency/wait time, and/or storage usage. The term "performance metric threshold," as used herein, may refer to a quantity or an amount of a specific performance metric beyond which or short of which certain conditions may apply. The term "traffic data," as used herein, may include data organized as tuples (or in some other manner) including, for example, tuples of a traffic data source, a traffic data destination, a number of queries per second (QPS)), and/or a time series of metric measurements from the back-end servers. The term "performance metric dimension," as used herein, may refer to a collection or category of performance metrics.

In some embodiments, the back-end routing engine estimates a linear relationship between variable traffic and variable performance metric for each back-end server based on collected historical data points. The back-end routing engine can reduce the weight of or expire the data points according to one or more time-based decay algorithms, such as an exponential decay algorithm. In embodiments where the weight of the data points are reduced, as time passes, older data points influences the estimated linear relationship less and less. The back-end routing engine can further estimate that linear relationship between traffic and performance metric for each grouping of servers (e.g., based on statistical summaries of data points of its member servers). Using the linear derivative estimate, the back-end routing engine can estimate how much traffic each geographical group of servers can take before the performance metric exceeds an assigned threshold. The back-end routing engine enables a geographical grouping of servers to route traffic outside of its own boundary if the threshold associated therewith is exceeded. For example, if a threshold is exceeded for a group of servers, a new routing table (e.g., published periodically) generated and published by the back-end routing engine for front-end servers would reflect traffic routes outside of the group boundary (e.g., geographical boundary, system boundary, sub-network boundary, or any combination thereof), even if the front-end servers are within the group boundary.

Referring now to the figures, FIG. 1 is block diagram illustrating an overview of a social networking system 100 in which some embodiments may operate. The social networking system 100 can include one or more client computing devices (e.g., a mobile device 105A, a desktop computer 105B, a computer server 105C, a laptop 105D, etc., collectively as the "client computing devices 105"). The client computing devices 105 may operate in a networked environment using logical connections to one or more remote computers (e.g., front-end servers 125) through an external network 110. Requests from the client computing devices 105 can reach a traffic routing server 115 first. The traffic routing server 115, in some embodiments, can be a customized load balancing server that monitors loads on different server clusters that contain at least a front-end server. For example, one or more front-end servers can be part of server clusters 120 (e.g., a server cluster 120A, a server cluster 120B, a server cluster 120C, etc., collectively as the "server clusters 120"). In some embodiments, the traffic routing server 115 resides in a "point of presence" (PoP) outside the data centers. In some embodiments, instead of making traffic routing decisions randomly or based solely on load constraints, the traffic routing server 115 can route traffic based on social information of the social networking system 100. For example, the traffic routing server 115 routes traffic from similar users to the same cluster while respecting load constraints to achieve improved cache hit rates without putting excessive load on the front-end clusters.

As illustrated, the social networking system 100 includes the server clusters 120. The server clusters 120 may be located in the same data center, in a different data center of the same geographical region, or in a different data center in another geographic region. Each server cluster can include different functional types (e.g., a front-end server type and/or a back-end server type) of computer servers.

In one example, the server cluster 120A is a multifunctional server cluster and includes one or more front-end servers 125A, one or more back-end servers 123A, and a caching layer 130A. In one example, the server cluster 120B is a back-end only server cluster, and includes one or more back-end servers 123B. In one example, the server cluster 120C is a front-end only cluster, and includes only the front-end servers 125C and the caching layer 130C. In embodiments where a server cluster is a front-end only cluster, the server cluster is connected to one or more back-end server clusters. Each back-end server cluster can include one or more databases that store data in a persistent manner.

The server clusters 120 can communicate with each other, a back-end polling server system 132, a back-end routing server system 136, or any combination thereof, via an internal network 140. The back-end polling server system 132 can collect performance metric measurements from the computer servers (e.g., back-end servers or both back-end and front-end servers) of the server clusters 120. The back-end polling server system 132 can provide the collected metric measurements to the back-end routing server system 136. The back-end routing server system 136 can periodically generate and publish one or more routing tables to the front-end servers in the server clusters 120 to facilitate the front-end servers to choose which back-end server to send an application service request.

Front-end servers, such as the front-end servers 125A and the front-end servers 125C, can implement application services to directly serve incoming client device requests from the client computing devices 105. For example, a front-end server can implement a Web server (e.g., that provides a web service) and/or an application programming interface for mobile applications (e.g., applications running on general-purpose operating systems of mobile devices) associated with the social networking system 100. The back-end servers (e.g., the back-end servers 123A and the back-end servers 123B) can implement application services that serve the front-end servers. Caching layer 130A and the caching layer 130C can cache recently used data for the front-end servers and/or back-end servers. In some embodiments, the back-end servers and the front-end servers respectively have different cache layers.

The traffic routing server 115 is a front-end routing service. The traffic routing server 115 directs one or more client device requests to the front-end servers (e.g., the front-end servers 125A or one of the front-end servers 125C) in the server clusters 120. A front-end server can process a client device request from one of the client computing devices 105. To complete the client device request, the front-end server can generate application service requests to one or more back-end servers (e.g., the back-end servers 123A and/or the back-end servers 123B).

It should be noted that the term "server" as used throughout this application refers generally to a computer, an electronic device, a program, or any combination thereof that processes and responds to requests (e.g., from the client computing devices 105 or from other servers). Servers can provide data to the requesting "clients." The term "client" as used herein refers generally to a computer, a program, an electronic device, or any combination thereof that is capable of processing and making requests and/or obtaining and processing any responses from servers. Client computing devices and server computing devices may each act as a server or client to other server/client devices. In some embodiments, the external network 110 is a wide area network (WAN) and the internal network 140 is also a WAN. In other embodiments, the internal network 140 is a local area network (LAN).

Figure 2:
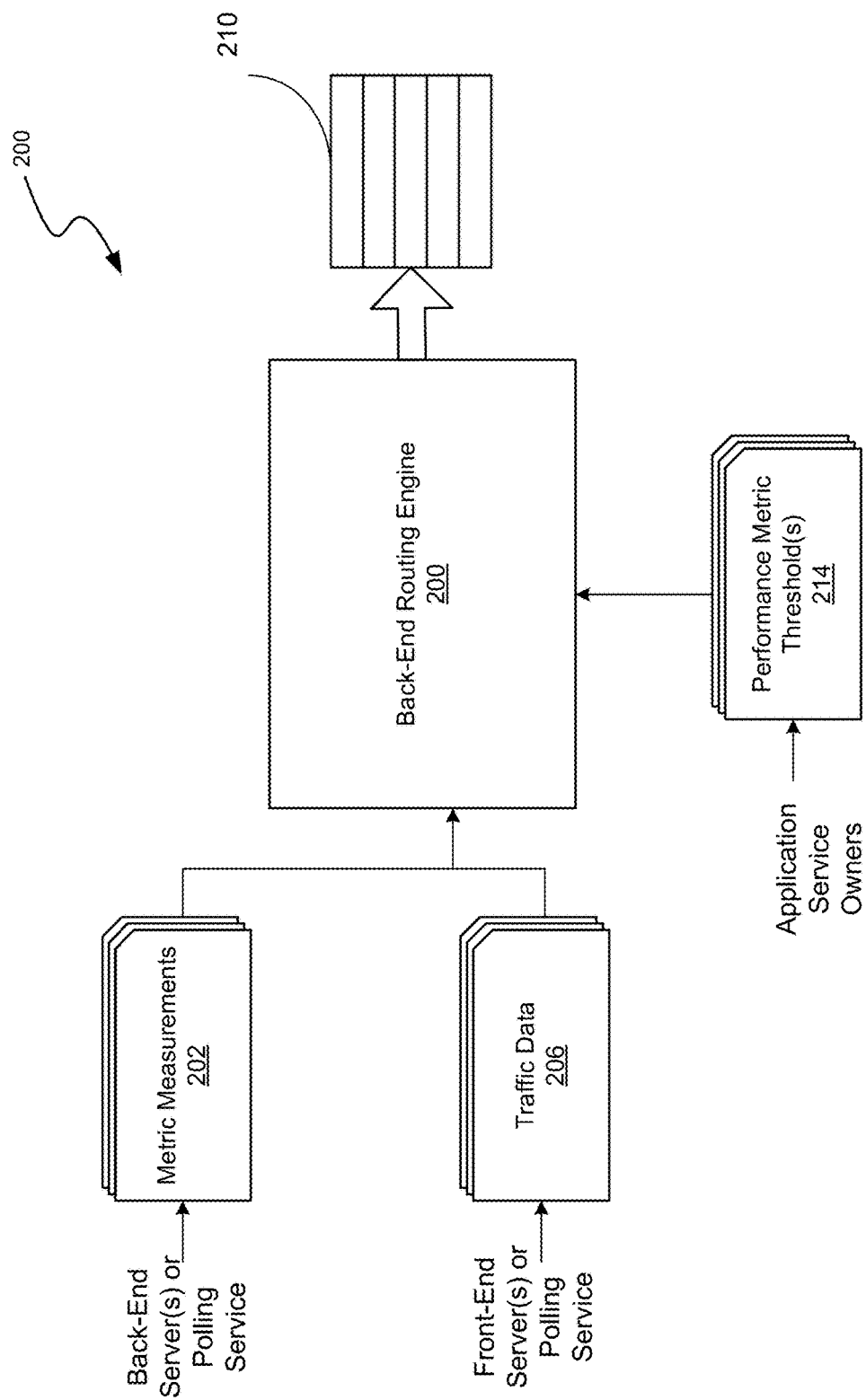
FIG. 2 is a data flow diagram illustrating a back-end routing engine, in accordance with various embodiments.

FIG. 2 is a data flow diagram illustrating a back-end routing engine 200, in accordance with various embodiments. The back-end routing engine 200 can be a software application. The back-end routing engine 200 can implement a routing table generation service on a computer system (e.g., the back-end routing server system 136). The back-end routing engine 200 can receive a data stream of metric measurements 202 and a data stream of traffic data 206. The data stream can provide data periodically or whenever the data becomes available. Both the traffic data 206 and the metric measurements 202 can be timestamped. The traffic data 206 are associated with application service requests from one or more front-end servers of a social networking system (e.g., the social networking system 100). The back-end routing engine 200 can be assigned to provide one or more routing tables 210 for the front-end servers.

The metric measurements 202 can correspond to at least a performance metric dimension for a set of one or more back-end servers. For example, the performance metric dimension can be processor usage, memory usage, network bandwidth usage, request queue length, request latency/wait time, storage usage, or any combination thereof. The back-end routing engine 200 can receive, for the set of one or more back-end servers, a performance metric threshold 214 corresponding to the performance metric dimension. The performance metric threshold 214 can correspond to a geographical tier in a server grouping hierarchy and to an application service type.

Every grouping of servers corresponding to the geographical tier and to the application service type can use the performance metric threshold 214 to determine whether to route traffic outside of the grouping border. The performance metric threshold 214 for a group of back-end servers can be compared against an average of the group, a median of the group, a mode of the group, a percentile metric level of the group, a maximum or minimum value of the metric measurements of the group, or other statistical summary of the metric measurements of the group). In some embodiments, the set of one or more back-end servers can send the back-end routing engine 200 the performance metric threshold 214 at any time. In some embodiments, the set of one or more back-end servers can publish the performance metric threshold 214 to a data storage, and the back-end routing engine 200 can poll periodically.

The back-end routing engine 200 can collect and pair the traffic data and the metric measurements into sample data points based on timestamps of the traffic data and metric measurements. A unit traffic data (e.g., x coordinate) and a unit metric measurement (e.g., y coordinate) with similar timestamps (e.g., within a threshold time window from each other) can be labeled as a single sample point. Based on timestamp data of the collected data points, the back-end routing engine 200 can expire or reduce the weight of at least a subset of the collected data points according to a decay function. For example, the decay function can be an exponential decay function.

Figure 3:
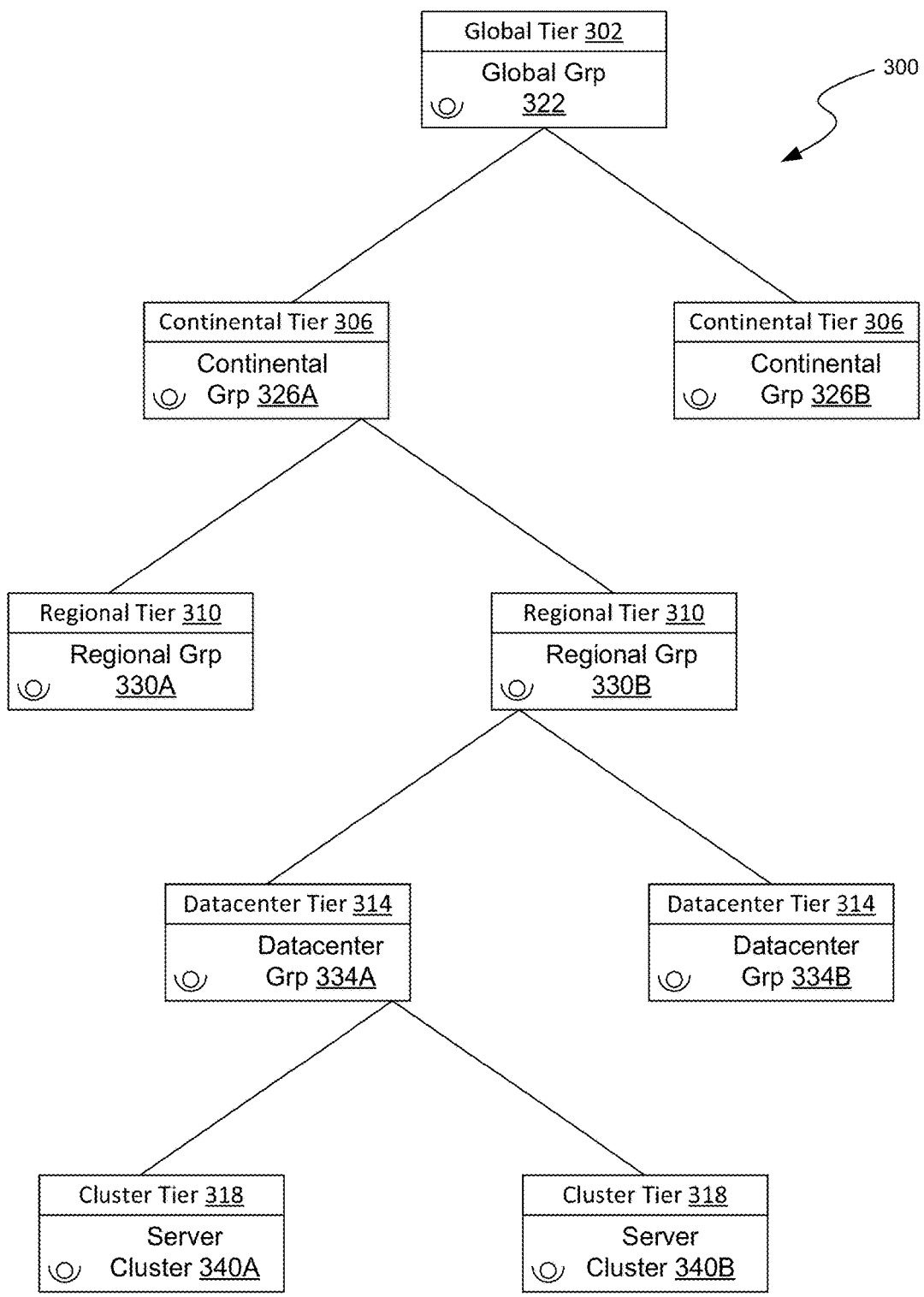
FIG. 3 is a tree diagram illustrating a server group hierarchy, in accordance with various embodiments.

FIG. 3 is a tree diagram illustrating a server group hierarchy 300, in accordance with various embodiments. In various embodiments, front-end servers and back-end servers of a social networking system (e.g., the social networking system 100) are grouped hierarchically (e.g., in separate groups or in mixed groups). In some embodiments, communication within a server group, on average, is faster than communication between a server in the server group and another server outside of the server group. In some embodiments, communication between a server in a server group and another server in a different server group in the same tier of the server group hierarchy 300, on average, is faster than communication between a server in a server group and another server in a different server group in a higher tier.

The server group hierarchy 300 can include a global tier 302, a continental tier 306, a regional tier 310, a datacenter tier 314, and a cluster tier 318. The global tier 302 can be the highest tier and includes all the servers of the social networking system. The continental tier 306 can be the second-highest tier, and can include a continental group 326A and a continental group 326B of computer servers (e.g., back-end servers). Next down in this example is the regional tier 310, and can include a regional group 330A and a regional group 330B of computer servers. Yet next down in this example is the datacenter tier 314, and can include a datacenter group 334A and a datacenter group 334B of computer servers. The last tier in this example can be the cluster tier 318, and can include a server cluster 340A and a server cluster 340B.

In some embodiments, a front-end server can be in the same group as a back-end server. In some embodiments, a server group can include multiple back-end application services. Each back-end application service can identify one or more performance metric thresholds 214 respectively corresponding to one or more performance metric dimensions.

Communication within each border of a geographical tier in the server group hierarchy 300 is cheaper (e.g., in terms of latency, bottlenecks, cost of connection, or any combination thereof) than across that border. For example, a front-end server can communicate with a back-end server in the same datacenter at a cheaper resource cost than to communicate with a back-end server in another datacenter.

In various embodiments, the back-end routing engine 200 compares a reported performance metric against a set of performance metric thresholds for one or more of the server group borders in the server group hierarchy 300. Each performance metric threshold can be specific to an application service type (e.g., a data cache service, a messenger service, a media player service, a newsfeed service, a location-based service, a content filter service, a machine learning service, etc., or any combination thereof). In some embodiments, server groups within the same geographical tier uses the same performance metric threshold. In some embodiments, the back-end routing engine 200 receives the metric measurements 202 collected from servers in the server group hierarchy 300. In some embodiments, only the metric measurements of the back-end servers are collected. In some embodiments, metric measurements of all servers are collected. In some embodiments, metric measurements of the back-end servers corresponding to one or more application service types are collected.

The back-end routing engine 200 can aggregate the metric measurements for back-end servers within a boundary (e.g., an averaged or a percentile of the aggregated whole). When the aggregated metric measurements for the back-end servers within a border reach that a performance metric threshold indicated by a back-end service, the back-end routing engine can start to offload requests for the back-end service to outside of the border, while still within the next highest border. The back-end routing engine 200 can specify a "blackhole" threshold which instructs the back-end routing engine to blackhole traffic (e.g., drop additional traffic) when a most recent metric measurement or metric measurements crosses the blackhole threshold. In various embodiments, the performance metric thresholds increase for each border in the server group hierarchy 300. The performance metric thresholds and the aggregation of metric measurements can be automatically or manually configured.

The back-end routing engine 200 can take as input a time series of current traffic data (e.g., tuples of source, destination, and queries per second (QPS)), and a time series of metric measurements from the back-end servers. The back-end routing engine 200 can apply a routing algorithm, which decides how traffic should be routed. The back-end routing engine can publish a routing table with the determined route to the front-end servers. The back-end routing engine 200 can repeat the update and publication of the routing table on a preset interval or variable interval. The interval of update can be configured to be high enough to account for response lag within the social networking system. For example, publishing to the front-end servers and aggregating traffic data from the front-end servers both take time. Further, metric measurements on the back-end servers may not react instantaneously to new traffic load. In some embodiments, the variable interval is manually configured. In some embodiments, the back-end routing engine measures and monitors the response lag, and determines the variable interval based on the measured response lag.

The back-end routing engine 200 can read the traffic data of the front-end servers and the metric measurements of the back-end servers. The back-end routing engine 200 can estimate a linear relationship (e.g., a derivative) between variable traffic measurements (e.g., QPSs) and variable metric measurements (e.g., in a performance metric dimensions) for each destination (e.g., a back-end server or a server group in a geographical tier). The back-end routing engine 200 can compute the linear relationship by computing the slope of a line between data points representative of sequential traffic and metric measurements. For example, the X coordinate of a data point can be traffic measurement and the Y coordinate of the data point can be a metric measurement. The back-end routing engine can use a decay function (e.g., exponential decay) to weight newer data points higher than older data points.

The back-end routing engine 200 can use the estimate of the linear relationship, for each server group, to estimate how much traffic each server group can take before the variable metric measurements exceed the performance metric threshold. The back-end routing engine can compute the "capacity" of the server group relative to a performance metric threshold at a hierarchical level. The capacity for a server group can increase with each hierarchical level for which a performance metric threshold has been set.

In some embodiments, the back-end routing engine 200 starts off with all traffic considered undistributed. The back-end routing engine can move up the hierarchical levels for which performance metric thresholds have been set, starting with the lowest level. For each level, the back-end routing engine 200 can scan undistributed traffic generated by its clients (e.g., front-end servers) within the border of that level, and the metric measurements of the back-end servers within that border. If it is not possible to distribute that traffic to the back-end servers and keep the back-end servers below their capacities at that level, the back-end routing engine 200 can distribute the traffic so that each back-end server reaches its capacity and the rest of the traffic is left undistributed. If possible, then the back-end routing engine distributes the traffic using the derivative estimations such that the spare capacity at that hierarchical level is proportional to the inverse of the estimated derivative, which ensures that the result in the metric being equal for the server groups to which traffic is distributed. If there is additional undistributed traffic left after the last hierarchical level (e.g., one level below the global level or the global level) for which there is a performance metric threshold and/or if that hierarchical level is the blackhole level, then the back-end routing engine blackholes the traffic thereto; otherwise, the back-end routing engine distributes the traffic in proportion to the inverse of the estimated derivative in order to equalize the metric measurements.

In some embodiments, the back-end routing engine 200 is configured to limit the amount of traffic onloaded to or offloaded from a back-end server during one interval (e.g., one cycle of generating and publishing the routing tables 210). This is useful to maintain stability, especially because the relationship between request traffic and metric measurements may not be linear, making the linear estimation sub-optimal.

In some embodiments, a server group may be manually drained (e.g., to reduce traffic) by setting a maximum QPS (e.g., 100 QPS or 0 QPS) to the server group. The back-end routing engine 200 can obey the maximum QPS unless all server groups in the same tier are being drained and the sum of their maximum QPSs is less than the traffic generated by the front-end servers. The back-end routing engine 200 can accomplish this by doing two rounds of the traffic routing determination. In the first round, the back-end routing engine can distribute traffic by obeying the maximum QPS. If additional undistributed traffic remains, the back-end routing engine can perform a second round of traffic route determination (e.g., as in the method 400) while not obeying the maximum QPS to distribute the remaining traffic.

In some embodiments, the metric measurements 202 may be configured to have an inverse relationship with the traffic data 206 (i.e. the metric measurements 202 decreases as the traffic data 206 increases). The performance metric dimension in this example can be idle central processing unit (CPU) percentage. In this case, the performance metric threshold can decrease for each border in the server group hierarchy 300.

In some embodiments, if all servers in a server group are not responsive to polls for metric measurements, the back-end routing engine 200 can automatically drain that server group. In some embodiments, the back-end routing engine 200 can utilize multiple performance metric dimensions. In these embodiments, an application service owner can send multiple performance metric thresholds per hierarchy tier corresponding to the multiple performance metric dimensions. At any level with multiple performance metric thresholds set for multiple performance metric dimensions, the metric measurements (e.g., normalized by the magnitude of the threshold value) that result in the lowest capacity for that hierarchy level/tier, along with its associated derivative, can be used for distributing traffic to that server group at that hierarchy level.

In various embodiments, the back-end routing engine 200 advantageously balances the often competing objectives of sending requests to the least loaded server and sending requests to a server that is nearby in the network. When set up with proper performance metric thresholds, the back-end routing engine 200 enables the server group hierarchy 300 to offload requests to servers that are slightly further away during periods of high local load, which enables the back-end routing engine 200 to provision fewer servers locally, thus saving precious computational resource.

Functional components (e.g., devices, engines, modules, and data repositories, etc.) associated with the social networking system 100, the back-end routing engine 200, and/or the server group hierarchy 300, can be implemented as a combination of circuitry, firmware, software, or other executable instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

Figure 4:
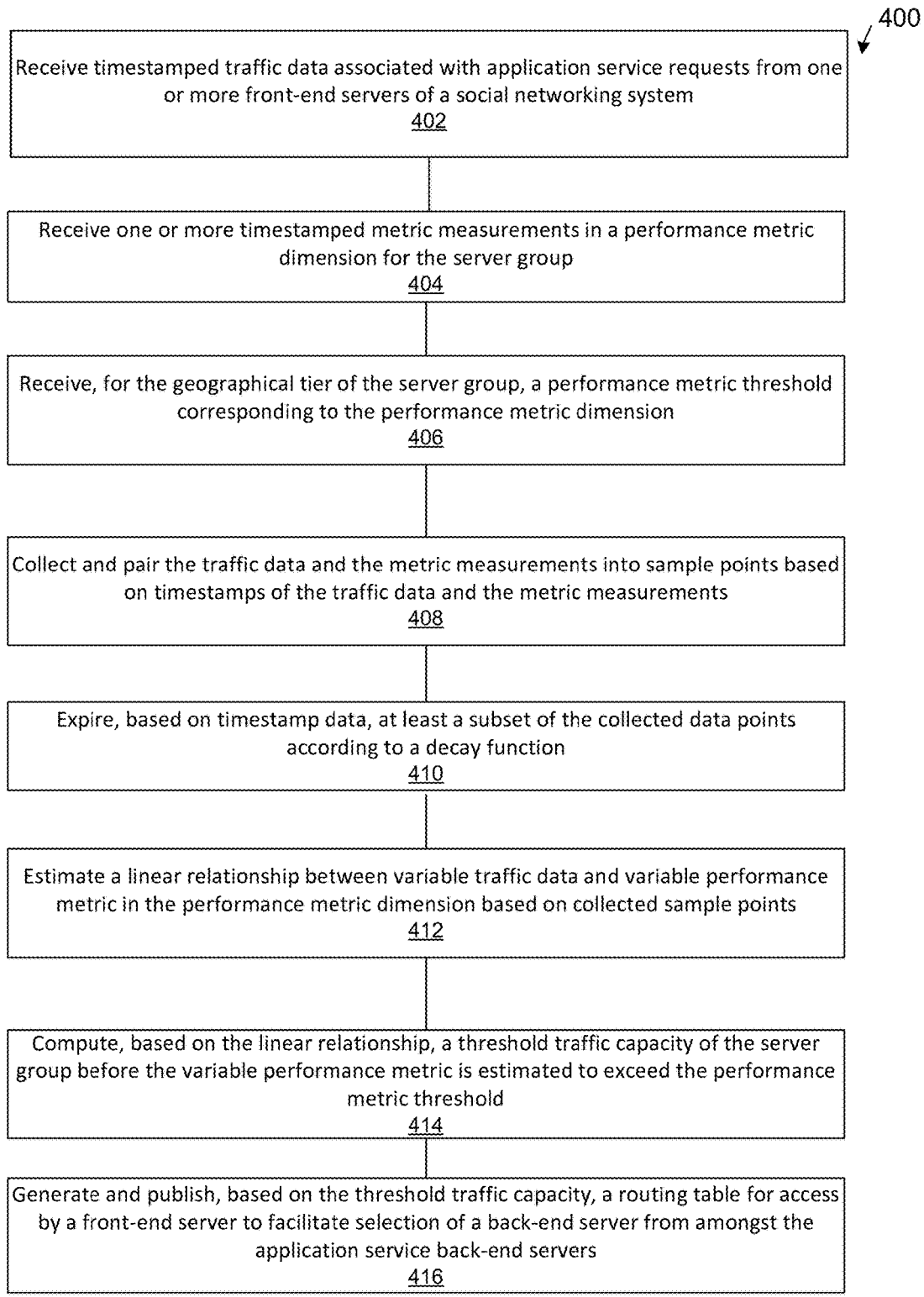
FIG. 4 is a flow chart illustrating a method of operating a back-end routing server system, in accordance with various embodiments.

FIG. 4 is a flow chart illustrating a method 400 of operating a back-end routing server system, in accordance with various embodiments. The back-end routing server system can be a single computing device (e.g., the computing device 500) or two or more computing devices working in sync as a collective computer system. In some embodiments, the back-end routing server system can include a computing device for updating a routing table specific for a back-end service. A back-end routing application/engine that runs a back-end routing service can be implemented on the back-end routing server system.

At step 402, the back-end routing server system can receive timestamped traffic data associated with application service requests from one or more front-end servers of a social networking system (e.g., the social networking system 100). The timestamped traffic data can include traffic data that characterizes amount of requests sent to a server group of one or more back-end servers that corresponds to a geographical tier in a server group hierarchy (e.g., the server group hierarchy 300) of application service back-end servers in the social networking system.

In some embodiments, the back-end routing server system receives the timestamped traffic data from the front-end servers themselves. In some embodiments, a traffic data collection engine running on a standalone computer server or a computer server system can collect the timestamped traffic data from the front-end servers. In these embodiments, the back-end routing server system receives the timestamped traffic data from the traffic data collection engine. The front-end servers are computer servers that process user queries/requests to the social networking system.

At step 404, the back-end routing server system can receive one or more timestamped metric measurements in a performance metric dimension for the server group. In some embodiments, the back-end routing server system can receive metric measurements in multiple performance metric dimensions. In some embodiments, the one or more timestamped metric measurements are collected periodically.

At step 406, the back-end routing server system can also receive, for the geographical tier of the server group, a performance metric threshold corresponding to the performance metric dimension. In some embodiments, the back-end routing server system can receive multiple performance metric thresholds for the geographical tier corresponding to the multiple performance metric dimensions. In some embodiments, the back-end routing server system can receive multiple performance metric thresholds corresponding to multiple geographical tiers in the server group hierarchy. In some embodiments, a performance metric threshold can correspond to a particular geographical tier and a particular performance metric dimension. The server group can correspond to the geographical tier in the server group hierarchy. In some embodiments, the back-end routing server system can receive timestamped metric measurements and performance metric thresholds from different server groups of back-end servers corresponding to different geographical tiers in the server group hierarchy.

The back-end servers are computer servers that correspond to one or more application services. The application services can process data for the frond-end servers. In some embodiments, the back-end routing server system is a stand-alone computer system separate from the front-end servers and the back-end servers. In some embodiments, the back-end routing server system is integrated with or part of the back-end servers and/or the frond-end servers.

At step 408, the back-end routing server system can collect and pair the traffic data and the metric measurements into sample points based on timestamps of the traffic data and the metric measurements. A unit traffic data and a unit metric measurement with similar timestamps (e.g., within a threshold time window from each other) can be labeled as a single sample point. At step 410, based on timestamp data, the back-end routing server system can expire or reduce the weight of at least a subset of the collected data points according to a decay function. For example, the decay function can be an exponential decay function.

At step 412, the back-end routing server system can estimate a linear relationship (e.g., a linear derivative estimate) between variable traffic data and variable performance metric in the performance metric dimension based on collected sample points respectively representing the received traffic data and the received performance metrics at different time points. In some embodiments, the linear relationship is based on the collected sample points representing the request traffic data and the corresponding performance metrics in a back-end server, a server cluster that includes at least a back-end server, a data center that includes at least a server cluster, or a region that includes at least a datacenter. In some embodiments, the back-end routing server system estimates the linear relationship based on statistical summaries of the collected data points (e.g., within one or more intervals of computing the routing table).

At step 414, the back-end routing server system can compute, based on the linear derivative estimate (e.g., the linear relationship), a threshold traffic capacity of the server group before the variable performance metric is estimated to exceed the performance metric threshold. At step 416, the back-end routing server system can generate and publish, based on the threshold traffic capacity, a routing table for access by a front-end server to facilitate selection of a back-end server destination from amongst the application service back-end servers. In some embodiments, the routing table is generated/updated periodically.

The threshold traffic capacity can determine whether a selected back-end server is in the server group or outside of the server group. For example, the threshold traffic capacity can determine how frequent that the front-end server selects a back-end server outside of the server group as the back-end server destination. For example, the back-end routing server system can compute an estimated performance metric of the server group based on the estimated linear derivative and a current traffic amount to the server group. The routing table can then be configured to instruct the front-end server to route traffic outside of the server group responsive to the estimated performance metric exceeding the performance metric threshold associated with the geographical tier. The routing table can be configured to instruct the front-end server to route traffic outside of the server group and in another server group within the geographical tier responsive to the estimated performance metric exceeding the performance metric threshold associated with the geographical tier.

The application service back-end servers are potential traffic destinations in the routing table. The routing table enables a set of front-end servers to route traffic outside of the server group responsive to the performance metric threshold associated with the geographical tier is exceeded.

For example, the back-end routing server system is configured to publish the routing table for the front-end servers whose traffic data were used to compute the linear derivative estimate. For example, if the performance metric threshold of the geographical tier is exceeded by the current or estimated metric measurements of server group, the back-end routing engine publishes a new routing table for front-end servers to use that reflects traffic routes outside of the boundary of the server group, even if the front-end servers are within the boundary of the server group.

In some embodiments, the routing table is a lookup table keyed by specific application service type and origin server cluster (e.g., the server cluster of the front-end server that is performing the look-up). The value of the lookup table can be the identity or identities of one or more back-end servers. The routing table can be configured to specify routing logic corresponding to all of the geographical tiers of the server group hierarchy.

In some embodiments, the back-end routing server system can receive a specification of a blackhole threshold for the geographical tier or to all tiers of the server group hierarchy. The back-end routing server system can configure the routing table to route traffic away from a back-end server responsive to the estimated metric measurement of the server group crossing the blackhole threshold. In some embodiments, the back-end routing server system can specify a traffic movement limit for the geographical tier or to all tiers of the server group hierarchy. The back-end routing server system can configure the routing table such that the generated routing table moves traffic to or away from the server group no more than the traffic movement limit as compared to a last iteration of the routing table.

In some embodiments, the back-end routing server system can specify a maximum traffic amount for the server group. When generating the routing table, the back-end routing server system can configure, in a first interval, the routing table to distribute traffic without exceeding the maximum traffic amount for the server group and configure, in a second interval following the first interval, the routing table to distribute traffic without regard to the maximum traffic amount.

In some embodiments, the back-end routing server system can determine whether the server group stops reporting further timestamped metric measurements. The back-end routing server system can then update the routing table to route traffic away from the server group.

In some embodiments, the back-end routing server system can receive multiple performance metric thresholds for the geographical tier and an application service type. The multiple performance metric thresholds can correspond respectively to multiple performance metric dimensions. The back-end routing server system can compute multiple traffic capacities of the server group respective for before the variable performance metric of each performance metric dimension is estimated to exceed each performance threshold. The back-end routing server system can then select the lowest of the multiple traffic capacities as the threshold traffic capacity.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 5:
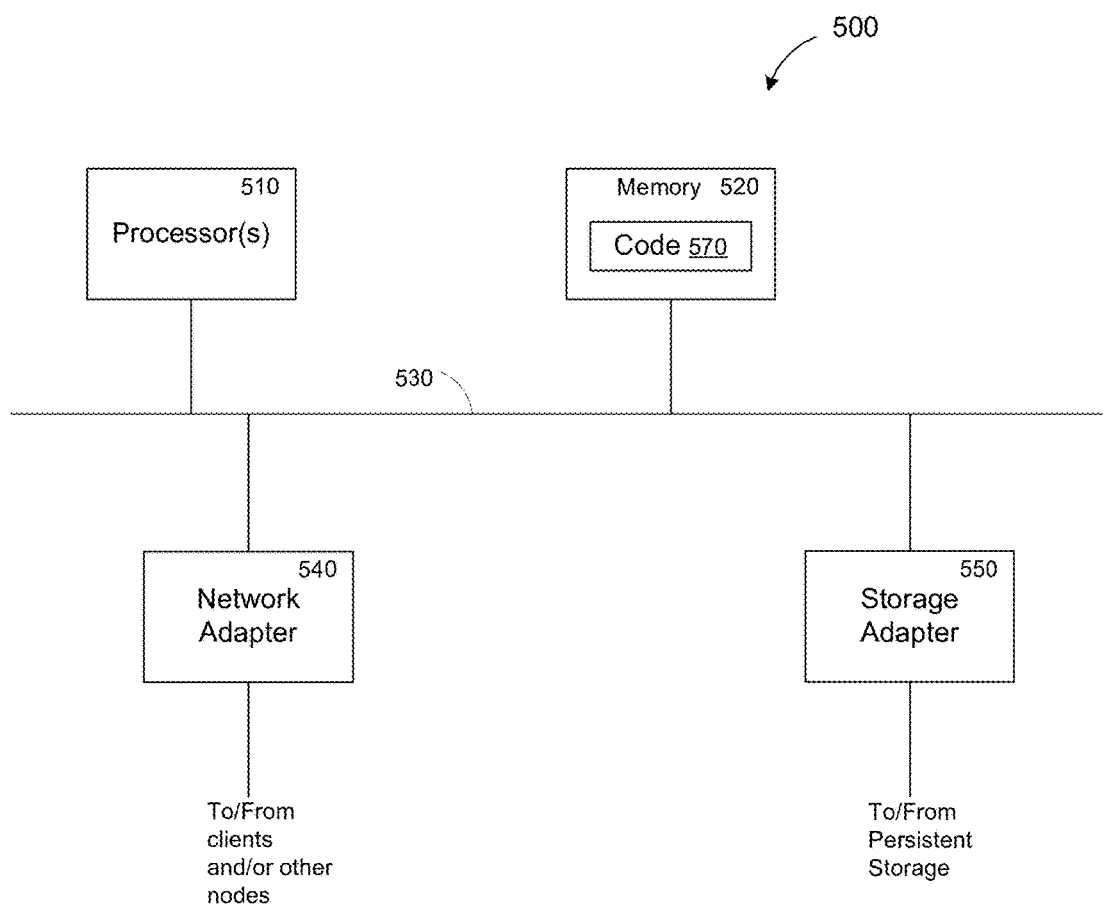
FIG. 5 is a block diagram of an example of a computing device, which may represent one or more computing device or server described herein, in accordance with various embodiments.

FIG. 5 is a block diagram of an example of a computing device 500, which may represent one or more computing device or server described herein, in accordance with various embodiments. The computing device 500 can implement one or more computing devices that implement the social networking system 100 of FIG. 1, the back-end routing engine 200 of FIG. 2, and/or the server group hierarchy 300 of FIG. 3. The computing device 500 can execute at least part of the method 400 of FIG. 4. The computing device 500 includes one or more processors 510 and memory 520 coupled to an interconnect 530. The interconnect 530 is an abstraction that represents any one or more separate physical buses, point-to-point connections, or both connected by appropriate bridges, adapters, or controllers. The interconnect 530, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 510 is/are the central processing unit (CPU) of the computing device 500 and thus controls the overall operation of the computing device 500. In certain embodiments, the processor(s) 510 accomplishes this by executing software or firmware stored in memory 520. The processor(s) 510 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 520 is or includes the main memory of the computing device 500. The memory 520 represents any form of random access memory (RAM), read-only memory (ROM), flash memory, or the like, or a combination of such devices. In use, the memory 520 may contain a code 570 containing instructions according to the mesh connection system disclosed herein.

Also connected to the processor(s) 510 through the interconnect 530 are a network adapter 540 and a storage adapter 550. The network adapter 540 provides the computing device 500 with the ability to communicate with remote devices, over a network and may be, for example, an Ethernet adapter or Fibre Channel adapter. The network adapter 540 may also provide the computing device 500 with the ability to communicate with other computers. The storage adapter 550 enables the computing device 500 to access a persistent storage, and may be, for example, a Fibre Channel adapter or SCSI adapter.

The code 570 stored in memory 520 may be implemented as software and/or firmware to program the processor(s) 510 to carry out actions described above. In certain embodiments, such software or firmware may be initially provided to the computing device 500 by downloading it from a remote system through the computing device 500 (e.g., via network adapter 540).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; and/or optical storage media; flash memory devices), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. Reference in this specification to where a result of an action is "based on" another element or feature means that the result produced by the action can change depending at least on the nature of the other element or feature.

What is claimed is:

1. A computer-implemented method, comprising:
   receiving timestamped traffic data that characterizes an amount of application service requests from one or more front-end servers of a networking system to a server group of one or more back-end servers in the networking system, and wherein the server group corresponds to a geographical tier in a server group hierarchy of application service back-end servers in the networking system, each geographical tier including back-end servers that are within a geographical border;
   polling, on a periodic basis, the one or more front-end servers and the one or more back-end servers for performance metric measurements;
   in response to the polling, receiving one or more timestamped performance metric measurements related to a performance metric dimension and further receiving a performance metric threshold corresponding to the performance metric dimension and the geographical tier, wherein the timestamped metric measurements are for the server group, and wherein the performance metric threshold is definable by an owner of the application service;
   estimating a linear derivative between the received timestamped traffic data and a variable performance metric in the performance metric dimension based on collected sample points respectively representing the received timestamped traffic data and the received timestamped metric measurements at different time points;
   computing, based on the estimated linear derivative, a threshold traffic capacity of the server group before the variable performance metric is estimated to exceed the performance metric threshold;
   generating, based on the threshold traffic capacity, a routing table for access by a front-end server to facilitate selection of a back-end server destination from amongst the application service back-end servers, wherein the threshold traffic capacity indicates when the front-end server is to select a target back-end server outside of the server group as the back-end server destination; and
   routing the application service requests to the server group specified in the generated routing table.

2. The computer-implemented method of claim 1, wherein the traffic data comprises at least one of: a tuple of source, destination, or queries per second (QPS)), or a time series of metric measurements from the back-end servers, and wherein the performance metrics comprise at least one of processor usage, memory usage, network bandwidth usage, request queue length, request latency/wait time, or storage usage.

3. The computer-implemented method of claim 1, further comprising receiving multiple performance metric thresholds corresponding to multiple geographical tiers in the server group hierarchy; and wherein the routing table is configured to specify routing logic corresponding to the geographical tiers.

4. The computer-implemented method of claim 1, further comprising: specifying a blackhole threshold for the geographical tier or to all tiers of the server group hierarchy; and wherein said generating the routing table includes configuring the routing table to route traffic away from a back-end server responsive to an estimated metric measurement of the server group crossing the blackhole threshold.

5. The computer-implemented method of claim 1, further comprising: specifying a traffic movement limit for the geographical tier or to all tiers of the server group hierarchy; and wherein said generating the routing table includes configuring the routing table such that the generated routing table moves traffic to or away from the server group no more than the traffic movement limit as compared to a last iteration of the routing table.

6. The computer-implemented method of claim 1, further comprising: specifying a maximum traffic amount for the server group; wherein said generating the routing table includes:
   configuring, in a first interval, the routing table to distribute traffic without exceeding the maximum traffic amount for the server group; and configuring, in a second interval following the first interval, the routing table to distribute traffic without regard to the maximum traffic amount.

7. The computer-implemented method of claim 1, wherein said estimating, computing, and generating are performed by a back-end routing engine running on a standalone server system separate from the front-end servers and the back-end servers.

8. The computer-implemented method of claim 1, wherein the server group is a server cluster that includes at least a back-end server, a datacenter that includes at least a server cluster, or a region that includes at least a datacenter.

9. The computer-implemented method of claim 1, further comprising expiring at least a subset of the collected sample points according to a decay function based on timestamp data of the collected sample points.

10. The computer-implemented method of claim 1, further comprising reducing one or more weights of at least a subset of the collected sample points according to a decay function based on timestamp data of the collected sample points, wherein said estimating includes adjusting the linear derivative based on a sample point proportional to a weight of the sample point.

11. The computer-implemented method of claim 1, wherein the received timestamped traffic data and the variable performance metric have a negative linear relationship.

12. The computer-implemented method of claim 1, further comprising receiving metric measurements and performance metric thresholds from different server groups of back-end servers corresponding to different geographical tiers in the server group hierarchy.

13. The computer-implemented method of claim 1, further comprising:
    computing an estimated performance metric of the server group based on the estimated linear derivative and a current traffic amount to the server group; and
    wherein the routing table is configured to instruct the front-end server to route traffic outside of the server group responsive to the estimated performance metric exceeding the performance metric threshold associated with the geographical tier.

14. The computer-implemented method of claim 13, wherein the routing table is configured to instruct the front-end server to route traffic outside of the server group and in another server group within the geographical tier responsive to the estimated performance metric exceeding the performance metric threshold associated with the geographical tier.

15. The computer-implemented method of claim 1, wherein the linear derivative is estimated based on statistical summaries of data points from different back-end servers in the server group.

16. A computer readable data storage memory storing computer-executable instructions that, when executed by a computer system, cause the computer system to perform a computer-implemented method, the instructions comprising:
    instructions for receiving timestamped traffic data that characterizes an amount of application service requests from one or more front-end servers of a networking system to a server group of one or more back-end servers in the networking system, and wherein the server group corresponds to a geographical tier in a server group hierarchy of application service back-end servers in the networking system, each geographical tier including back-end servers that are within a geographical border;
    instructions for polling, on a periodic basis, the one or more front-end servers and the one or more back-end servers for performance metric measurements;
    instructions for receiving, in response to the polling, one or more timestamped performance metric measurements related to a performance metric dimension and further receiving a performance metric threshold corresponding to the performance metric dimension and the geographical tier, wherein the timestamped metric measurements are for the server group, and wherein the performance metric threshold is definable by an owner of the application service;
    instructions for estimating a linear derivative between the received timestamped traffic data and a variable performance metric in the performance metric dimension based on collected sample points respectively representing the received timestamped traffic data and the received timestamped metric measurements at different time points;
    instructions for computing, based on the estimated linear derivative, a threshold traffic capacity of the server group before the variable performance metric is estimated to exceed the performance metric threshold;
    instructions for generating, based on the threshold traffic capacity, a routing table for access by a front-end server to facilitate selection of a back-end server from amongst the application service back-end servers, wherein the threshold traffic capacity indicates when the front-end server is to select a target back-end server outside of the server group as the back-end server destination, and wherein the application service back-end servers are potential traffic destinations in the routing table; and
    instructions for routing the application service requests to the server group specified in the generated routing table.

17. The computer readable data storage memory of claim 16, wherein the instructions further comprises:
    instructions for determining whether the server group stops reporting further timestamped metric measurements; and
    instructions for updating the routing table to route traffic away from the server group.

18. The computer readable data storage memory of claim 16, wherein the front-end servers are computer servers that process user device requests to the networking system and the back-end servers are computer servers correspond to one or more application services that processes data for the front-end servers.

19. A computer system, comprising:
    non-transitory memory configured to store executable instructions;
    one or more processors configured by the executable instructions to:
        receive timestamped traffic data that characterizes an amount of application service requests from one or more front-end servers of a networking system to a server group of one or more back-end servers in the networking system, and wherein the server group corresponds to a geographical tier in a server group hierarchy of application service back-end servers in the networking system, each geographical tier including back-end servers that are within a geographical border;
        poll, on a periodic basis, the one or more front-end servers and the one or more back-end servers for performance metric measurements;

in response to the polling, receive one or more timestamped performance metric measurements in a performance metric dimension and further receive a performance metric threshold corresponding to the performance metric dimension and the geographical tier, wherein the timestamped metric measurements are for the server group, and wherein the performance metric threshold is definable by an owner of the application service;

collect and pair the timestamped traffic data and the timestamped metric measurements into sample points based on timestamps of the timestamped traffic data and the timestamped metric measurements;

estimate a linear derivative between the received timestamped traffic data and a variable performance metric in the performance metric dimension based on collected sample points respectively representing the received timestamped traffic data and the received timestamped metric measurements at different time points;

compute, based on the estimated linear derivative, a threshold traffic capacity of the server group before the variable performance metric is estimated to exceed the performance metric threshold;

generate, based on the threshold traffic capacity, a routing table for access by a front-end server to facilitate selection of a back-end server from amongst the application service back-end servers, wherein the threshold traffic capacity indicates when the front-end server is to select a target back-end server outside of the server group as the back-end server destination; and route the application service requests to the server group specified in the generated routing table.

20. The computer system of claim 19, wherein the one or more processors are configured to receive multiple performance metric thresholds for the geographical tier and a single application service type, wherein the multiple performance metric thresholds correspond to multiple performance metric dimensions, and wherein the one or more processors are configured to:

compute multiple traffic capacities of the server group respective for before variable performance metric of each performance metric dimension is estimated to exceed each performance threshold; and select lowest of the multiple traffic capacities as the threshold traffic capacity.

* * * * *